G. H. BARSCHOW.
CHILD'S SULKY.
APPLICATION FILED JUNE 2, 1913.
1,127,389.
Patented Feb. 9, 1915.
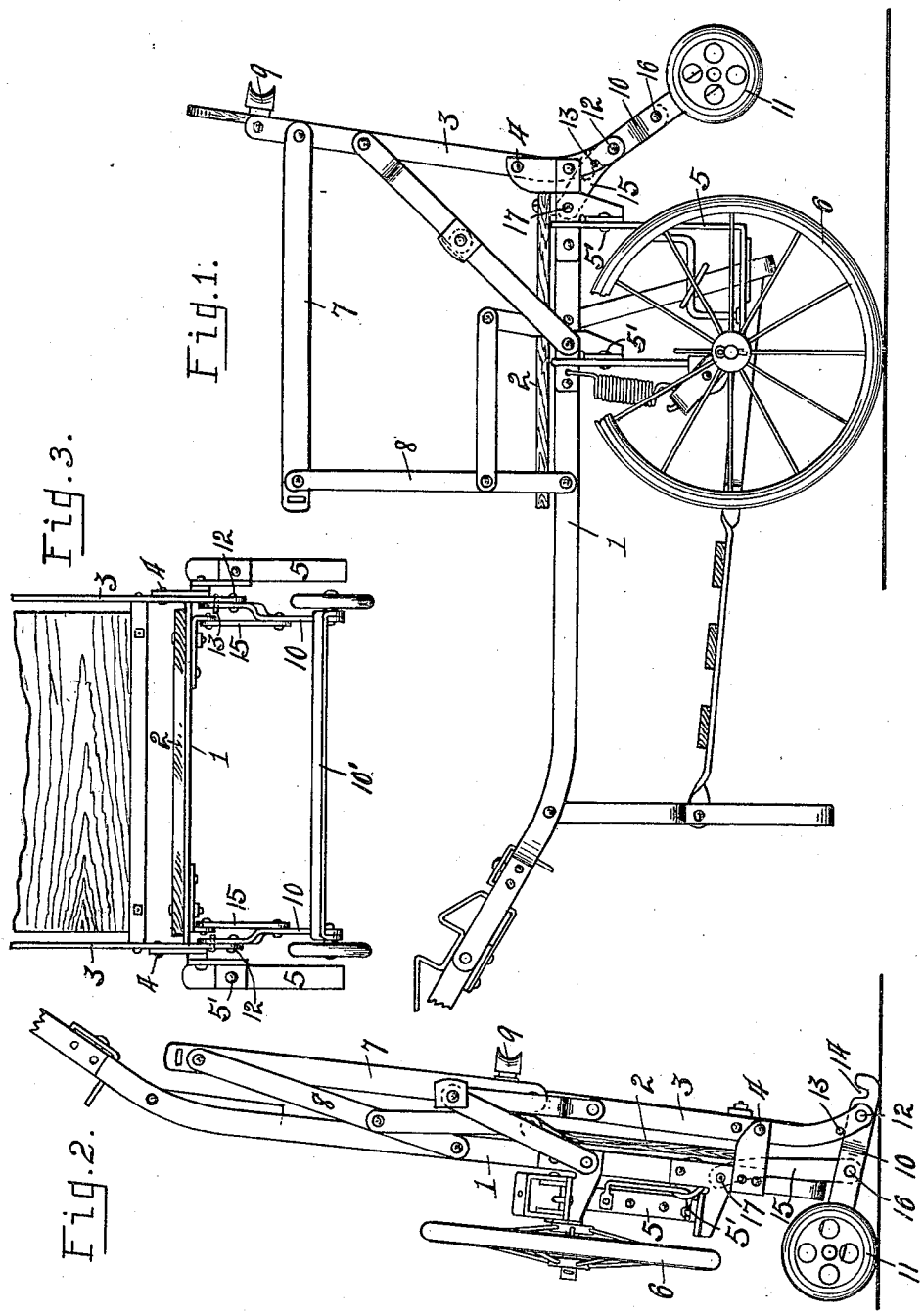
WITNESSES:
D. C. Walter
C. H. Bills
INVENTOR.
George H. Barschow,
By Owen & Owen.
His attys.

UNITED STATES PATENT OFFICE.

GEORGE H. BARSCHOW, OF TOLEDO, OHIO, ASSIGNOR TO THE AMERICAN METAL WHEEL & AUTO COMPANY, OF TOLEDO, OHIO, A CORPORATION OF OHIO.

CHILD'S SULKY.

1,127,389.     Specification of Letters Patent.     Patented Feb. 9, 1915.

Application filed June 2, 1913. Serial No. 771,330.

*To all whom it may concern:*

Be it known that I, GEORGE H. BARSCHOW, a citizen of the United States, and a resident of Toledo, in the county of Lucas and State of Ohio, have invented a certain new and useful Child's Sulky; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

This invention relates particularly to collapsible or foldable children's vehicles of the sulky type; and has for its object the provision, in connection with vehicles of this character, of improved means for carrying a small supplemental wheel or wheels at the rear of the seat frame to assist in lowering or raising the main wheels relative to curb-stones, steps, or the like, in the path of movement of the vehicle, whereby to enhance the practicability and commercial value thereof.

A further object of the invention is the provision of means of this character which is attached to both the back and seat frames of the vehicle and has its folding and unfolding movements controlled by the relative folding and unfolding movements of the back and seat frame, respectively, and which when folded is adapted to form a wheeled support to provide a standard for supporting the folded vehicle in upright position.

The invention is fully described in the following specification, and while, in its broader aspect, it is capable of embodiment in numerous forms, a preferred embodiment thereof is illustrated in the accompanying drawings, in which,—

Figure 1 is a side elevation of a sulky in unfolded position embodying my invention with parts broken away and removed. Fig. 2 is a side elevation thereof in upright folded position, and Fig. 3 is a rear end elevation of Fig. 1, with parts broken away and removed.

Referring to the drawings, 1 designates the seat frame of a vehicle embodying the invention, 2 a seat rigidly carried by said frame, 3, 3 the side-bars of the back-frame, which bars are pivoted to the ends of the seat-frame side bars, as at 4, for forward folding movements over the seat, 5 the side frames which are hinged, as at 5', to the sides of the seat-frame for lateral folding movements thereunder as is well understood in the art, and 6 the main supporting wheels, one of which is carried by each side frame 5 of the vehicle. An arm 7 is pivoted to and projects forward from the upper portion of each side bar 3 of the back, and is supported at its forward end by an upright arm or standard 8, which pivots at its upper and lower ends to the arm and seat-frame, respectively.

9 designates a handle which is provided on the upper rear portion of the back.

As the construction of the vehicle proper and the folding mechanism thereof is common in vehicles of this character and forms no part of the present invention, the same will not be described.

The lower end of each side-bar 3 of the back-frame is preferably projected below the rear end of the seat frame and curved slightly rearward from its pivot, as shown and pivoted to the lower end of each of such side-bar extensions is an arm 10, which, when the vehicle is in set-up or unfolded position, extends rearward and downward from the bars 3 and each carries a small supplemental wheel 11 at its lower end. A bar 10' connects the arms 10, 10 to relatively brace the same. The inner end of each arm 10 is extended beyond the pivot 12, which connects the arm and respective back-frame bar 3, and is adapted to bear against a registering pin 13 on the adjacent portion of the bar 3 to limit the unfolding movements of the arm relative to such bar. The inner end of the arm is shown as being notched, as at 14, to fit over the pin 13. A link 15 is pivotally attached at one end to each arm 10, as at 16, and is pivotally attached at its opposite end to the rear end portion of the respective side-bar of the seat-frame 1 in advance of the back-frame, as at 17. The links 15, one of which is disposed at each side of the vehicle, coöperate with the pins 13 to hold the wheel carrying arms 10 in rigid projected relation to the seat and back frames when the sulky parts are in unfolded position, and coöperate with the back frame in the unfolding or collapsing movements thereof to impart inward or collapsing movements to the arms 10, 10.

It is evident that upon a folding movement of the back-frame over the seat-frame of the vehicle, the elevating movements of the lower ends of the side-bars 3 of the back-frame will impart an elevating movement to the arms 10, 10 and cause a pivotal movement of such arms relative to the bars 3 due to the action of the links 15 thereon, so that when the parts are folded the arms 10, 10 will be disposed substantially transversely of the seat-frame 1, back-frame bars 3, and links 15, as shown in Fig. 2, with the wheels 11 disposed in substantially the plane of the under folded wheels 6. The wheels 11 and arms 10 when in folded position serve as a supporting base for the vehicle to permit it to stand in upright position, as shown in Fig. 2. As the folding of the wheels 11 relative to the frame does not turn the wheel axles but permits the wheels to stand in position to rest in rolling contact with a subjacent support it is possible to roll the vehicle along when in folded position. It is evident from the above that the folding and unfolding movements of the wheel carrying arms 10 depend entirely upon the relative folding and unfolding movements of the vehicle back relative to the seat-frame, and that the wheels 11 are capable of permitting a wheeling of the vehicle thereon whether the vehicle is in folded or unfolded form.

I wish it understood that my invention is not limited to any specific construction or arrangement of the parts except in so far as such limitations are specified in the claims.

Having thus described my invention, what I claim as new, and desire to secure by Letters Patent, is,—

1. The combination in a vehicle of the class described having a seat-frame and a back-frame foldable one over the other, and main wheel carrying means, of supplemental wheel carrying means attached to said seat and back frames and operable to have folding and unfolding movements relative to said frames when the frames are relatively folded or unfolded.

2. A vehicle of the class described having two separate sets of wheels, means carrying one set of wheels for folding movements under the vehicle crosswise thereof, means carrying the other set of wheels for folding movements relative to the vehicle lengthwise thereof, and means operable to impart folding and unfolding movements to the respective sets.

3. In a vehicle of the class described, a seat-frame, a back-frame hinged thereto, a main wheel support for the seat-frame, and supplemental supporting means projecting downwardly and rearwardly from the rear end portion of the seat frame and having connection with both said seat and back frames and operable by the relative folding and unfolding movements of said frames to have folding and unfolding movements respectively relative to the seat frame.

4. In a vehicle of the class described, the combination with a seat-frame, a member pivotally attached to and rising from said seat-frame, and main wheel carrying means foldable crosswise under the seat frame, of means independent of said wheel carrying means connected to said frame and member and operable by relative pivotal movements thereof to have folding and unfolding movements relative to said frame longitudinally thereof.

5. In a vehicle of the class described, the combination with the foldably connected seat-frame and the back-frame, of a supplemental supporting arm pivotally attached to and projecting from said back frame for limited pivotal movements relative thereto in the longitudinal plane of the vehicle, and means connecting said arm and seat-frame for controlling the pivotal movements of the arm when the seat and back-frames are relatively moved.

6. In a vehicle of the class described, the combination with the foldably connected seat-frame and the back-frame, of an arm pivotally attached to and projecting from said back-frame for limited pivotal movements relative thereto in the longitudinal plane of the vehicle, a small supplemental supporting wheel carried by said arm for turning movements in the plane of pivotal movements of the arm, and means connecting the arm and seat-frame for imparting predetermined pivotal movements to the arm when the back and seat frames are relatively moved.

7. In a vehicle of the class described, the combination with the seat-frame and a member carried thereby for pivotal folding movements relative thereto, of an arm carried by said member for limited pivotal movements relative thereto in the plane of folding movements of the member relative to the frame, a supplemental supporting wheel carried at the outer end of said arm, and means connecting said arm and seat-frame for imparting predetermined pivotal movements to the arm relative to said frame and member when they are relatively moved.

8. In a vehicle of the class described, a seat-frame, a back-frame pivoted to the seat-frame for folding movements relative thereto and having side-bars projected below its pivot, arms carried by the projected ends of such side bars for limited pivotal movements relative thereto longitudinally of the seat-frame, supplemental supporting wheels carried by said arms, and means connecting said arms and seat-frame for imparting predetermined pivotal movements to the arms when the seat and back frames are relatively moved.

9. In a vehicle of the class described, the combination of a seat-frame and back-frame foldably connected, the back-frame having its side bars extended below the back frame pivot, an arm carried by the extended end of each side bar for limited pivotal movements relative thereto in the plane of folding movements of the back, a supplemental wheel carried at the outer end of each arm, and a link for each arm pivotally attached to the respective arm between its pivot and wheel and pivotally attached at its opposite end to the respective side of the seat-frame in advance of the plane of the back-frame pivot and operable to impart predetermined pivotal movements to the respective arm when the seat and back frames have relative pivotal movements.

10. A vehicle of the class described having wheels foldable to horizontal positions under the vehicle and a wheel disposed to vertically permit a forward and backward wheeling of the vehicle when said first wheels are folded.

11. A vehicle of the class described having a set of wheels foldable to horizontal positions under the vehicle, and a wheel movable lengthwise of the vehicle and disposed to permit a forward and backward wheeling of the vehicle both when folded and unfolded.

12. In a vehicle of the class described, seat and back frames pivotally connected for relative folding movements, wheels mounted for folding movements under the seat frame transversely thereof, a wheel mounted for folding and unfolding movements lengthwise of the seat frame, and means operable by relative movements of the seat and back frames to impart respective folding and unfolding movements to said wheels.

13. The combination with a vehicle of the class described having wheels foldable transversely thereunder, of a wheel mounted only for folding movements lengthwise of the vehicle.

14. The combination with a vehicle of the class described having wheels foldable transversely thereof, of a frame projecting from the vehicle at the rear of said wheels for folding movements lengthwise of the vehicle, and a wheel carried by said frame and when in folded position being usable to permit a forward wheeling of the vehicle.

15. The combination with a vehicle of the class described having a pair of wheels foldable in opposite directions thereunder, of a wheel foldably carried by the vehicle and serving both when in folded and unfolded positions to permit a forward wheeling of the vehicle.

16. The combination with a vehicle of the class described having a pair of wheels foldable in opposite directions thereunder, and a foldable back-frame, of supplemental supporting means carried by the vehicle and having connection with said back-frame, said means being movable longitudinally of the vehicle by folding and unfolding movements of the back-frame.

17. The combination with a vehicle of the class described having a pair of wheels folded in opposite directions thereunder, and a foldable back-frame, of supplemental supporting means carried by the vehicle and having connection with said back-frame, said means being foldable longitudinally of the vehicle by folding movements of the back-frame, and a wheel carried by said supporting means and coöperating therewith to provide a wheeled support for the vehicle both when in folded and unfolded positions.

18. A vehicle of the class described having main supporting wheels foldable in transverse relation thereto and supplemental supporting wheels foldable in longitudinal relation thereto and the latter serving as a wheeled support for the vehicle both when in folded and set up positions.

19. In a vehicle of the class described, a main frame, side wheel carrying frames pivoted to respective sides of the main frame for folding thereunder, a trailer frame projecting from the main frame at the rear of said side frames, and a supplemental supporting wheel carried by said trailer frame and coöperating therewith to form a wheeled support for the vehicle both when in folded and in set up positions.

20. In a vehicle of the class described, a main frame, a supplemental supporting means foldably carried by said main frame and operable to have folding movements in a direction longitudinally of said frame, said means having parts which when in folded position stand cross-wise of the direction of projection of the main frame and are adapted to rest upon a subjacent support to assist in supporting the vehicle in upright position.

In testimony whereof I have hereunto signed my name to this specification in the presence of two subscribing witnesses.

GEORGE H. BARSCHOW.

Witnesses:
C. W. OWEN,
F. E. AUL.